US012756030B2

(12) United States Patent
Chang

(10) Patent No.: US 12,756,030 B2
(45) Date of Patent: Oct. 6, 2026

(54) BATTERY MODULE HAVING MODIFIED HEAT PIPE STRUCTURE

(71) Applicant: STL TECHNOLOGY CO., LTD., Kaohsiung City (TW)

(72) Inventor: Cooper Chang, Kaohsiung City (TW)

(73) Assignee: STL TECHNOLOGY CO., LTD., Kaohsiung City (TW)

( * ) Notice: Subject to any disclaimer, the term of this patent is extended or adjusted under 35 U.S.C. 154(b) by 811 days.

(21) Appl. No.: 18/125,153

(22) Filed: Mar. 23, 2023

(65) Prior Publication Data

US 2023/0402676 A1 Dec. 14, 2023

(30) Foreign Application Priority Data

Jun. 8, 2022 (TW) ................................. 111121320

(51) Int. Cl.
*H01M 10/6552* (2014.01)
*H01M 10/6566* (2014.01)
*H01M 50/204* (2021.01)

(52) U.S. Cl.
CPC ... *H01M 10/6552* (2015.04); *H01M 10/6566* (2015.04); *H01M 50/204* (2021.01)

(58) Field of Classification Search
CPC ......... H01M 10/6552; H01M 10/6566; H01M 50/204; H01M 10/613; H01M 10/6551; Y02E 60/10
See application file for complete search history.

(56) References Cited

PUBLICATIONS

DE-102013215929-B4. Kutz Dietmar. H01M10/6552 (Year: 2025).*
CN-214505603-U. Chen, Jian-Yu. Y02E60/10 (Year: 2025).*

* cited by examiner

*Primary Examiner* — Stewart A Fraser
(74) *Attorney, Agent, or Firm* — HDLS IPR SERVICES; Chun-Ming Shih

(57) ABSTRACT

This disclosure provides a battery module having a modified heat pipe structure. The battery module includes a battery fixed holder for accommodating and fixing a plurality of battery cells. The modified heat pipe structure includes a metal pipe, which is defined with a thermal conduction section, a container section, and a connection section thereon. The thermal conduction section is a vacuum-pumped sealed tube, includes a wick structure and a working fluid thereinside, and transfers a heat through a process of evaporation and a condensation of the working fluid. The container section is placed in a gap between the adjacent battery cells, and stores the heat generated by the battery cells in charging or discharging. The connection section is provided with one end connected to the container section, and provided with other end connected to one end of the thermal conduction section by passing through the battery fixed holder vertically.

14 Claims, 11 Drawing Sheets

BATTERY MODULE HAVING MODIFIED HEAT PIPE STRUCTURE

This non-provisional application claims priority claim under 35 U.S.C. § 119(a) on Taiwan Patent Application No. 111121320 filed Jun. 8, 2022, the entire contents of which are incorporated herein by reference.

FIELD OF THE INVENTION

The disclosure relates to a battery module, more particularly, a battery module capable of performing a heat dissipation or a heat balance to a plurality of battery cells by a modified heat pipe structure.

BACKGROUND

In recent years, electric vehicles are gradually favored by people for reducing carbon of environmental protection. One after another, many automakers have entered into the development of electric vehicles to seize business opportunities in the electric vehicle market. Power source of electric vehicles is batteries, such as lithium batteries. For increasing longer driving range of the electric vehicle, a battery module with a considerable number of battery cells is usually installed on the electric vehicle to provide enough power for the electric vehicle in use.

Referring to FIG. 1, FIG. 2, and FIG. 3, there are shown a top sectional view, a front sectional view, and a side sectional view of a battery module in prior art. As shown in FIG. 1, FIG. 2, and FIG. 3, the battery module 100 includes a shell 11, a plurality of battery cells 12, a first fixed holder 131, and a second fixed holder 132. These battery cells 12 fixed between the first fixed holder 131 and the second fixed holder 132 will be placed in the shell 11.

A heat is generated from the battery cells 12 of the battery module 100 in charging or discharging. To dissipate the heat generated from the battery cells 12, the shell 11 is usually provided at a front end thereof configured with a blowing fan 151, and provided at a rear end thereof configured with an exhausting fan 153. The first fixed holder 131 and the second fixed holder 132 are placed between the blowing fan 151 and the exhausting fan 153. The blowing fan 151 is used to blow an external cold air towards the positions where the battery cells 11 of the battery module 100 are located, and then the cold air will become a hot air after passing through the hot battery cells 11. Afterwards, the exhausting fan 153 exhausts the hot air to an outside of the shell 15 to desire that a temperature of the battery cells 11 in charging or discharging can be lowered.

In the past, the battery cells 12 were arranged horizontally at the same height between the first fixing frames 131 and the second fixing frame 132. A high flow resistance occurs because most of the cold air blown from the blowing fan 151 is blocked by the battery cells 12 arranged at a front row closer to the blowing fan 151. Only a small amount of the cold air can flow through gaps between the battery cells 12 arranged at the front row to the battery cells 12 arranged at a rear row. Furthermore, in order to dispose a large number of the battery cells 12 within a limited space of the first fixed holder 131 and the second fixed holder 132, the gaps between the battery cells 12 are usually very small, which will also cause the high flow resistance. The circulation efficiency of the cold air among the battery cells 12 is very poor because of the high flow resistance. Accordingly, the cold air blown from the blowing fan 151 can only flow to the places where are having low flow resistance. For example, the cold air is usually blown to the battery cells 12 closer to the blowing fan 151, or the cold air is usually blown to the outsides of the first fixed holder 131 and the second fixed holder 132, such that the battery cells 12 disposed at positions where are farther away from the blowing fan 151 or the battery cells 12 arranged at an inner side of the battery module 100 will hardly receive the cold air blown from the blowing fan 151.

Taking FIG. 1 as an example, when the battery module 100 is operating, it can use a temperature detector to detect temperatures of the battery cells 12 located at four areas A, B, C, and D, respectively. Based on the position of the blowing fan 151, the arrangement in order from closest to farthest is area A, area B, area C, and area D. By detecting the temperatures of areas A, B, C, and D, the temperature around the battery cells 12 at area A may be T1, the temperature around the battery cells 12 at area B may be T2, the temperature around the battery cells 12 at area C may be T3, and the temperature around the battery cells 12 at area D may be T4, for example, T4>T3>T2>T1. The temperature T4 of area D farther away from the blowing fan 151 are high than that of the temperatures of other areas. Therefore, during the charging or discharging, the temperatures of the battery cells 12 farther away from the blowing fan 151 will be high than the temperatures of the battery cells 12 closer to the blowing fan 151. The battery cells 12 at a higher temperature will have a faster aging rate, and thereby the life of the battery cells 12 will be affected.

Besides, the cold air is blown into the battery module 100 from the blowing fan 151, and will exchange heat with every passing batter cells 11. That is, the air received by the battery cells 11 arranged at the rear row is an air that has completed to exchange heat with the battery cells 11 arranged at the front row. Therefore, the temperature of each of the battery cells 11 within the battery module 100 presents a higher and higher temperature gradient according to far and near from the blowing fan 151, and thereby the aging speed of the battery cells 11 arranged at the rear row is much faster than that of the battery cells 11 arranged at the front row.

SUMMARY

It is one objective of the disclosure to provide a battery module, which includes a shell, a battery fixed holder, a plurality of battery cells, and a modified heat pipe structure. The shell is provided at one side thereof with an air inlet, and provided at other side thereof with an air outlet. The battery fixed holder is located between the air inlet and the air outlet, and used for accommodating and fixing the battery cells. The modified heat pipe structure includes a metal tube. The metal tube is defined with a thermal conduction section, a first container section, and a first connection section thereon. The thermal conduction section is disposed above the battery fixed holder. The first container section is placed in a gap between multiple adjacent battery cells located farther away from the air inlet, and connected to the thermal conduction section via the first connection section. When the battery module is operating, the first container section absorbs the heat generated by the battery cells surrounding the first container section in charging or discharging, and conducts the heat to the thermal conduction section via the first connection section. Then, a working fluid in the thermal conduction section can repeatedly perform a phase change process of evaporation and condensation so as to take away the heat generated by the battery cells surrounding the first container section in charging or discharging, and thereby the heat dissipation of the battery cells surrounding the first container section can be achieved.

It is other objective of the disclosure to provide a battery module, wherein the thermal conduction section is provided with an evaporator end connected to the first connection section, and provided with a condensation end connected to a heat sink. The heat transferred by the thermal conduction section can be dissipated by the heat sink. Ideally, the heat sink is placed next to a blowing air device. Thus, the heat dissipation of the heat sink can be efficiently enhanced through blowing air of the blowing device.

It is another objective of the disclosure to provide a battery module, wherein the metal tube of the modified heat pipe structure is further defined with a second container section and a second connection section thereon. The second container section can be placed in a gap between multiple adjacent battery cells located at positions closer to the air inlet, and connected to the condensation end of the thermal conduction section via the second connection section. The heat generated by the battery cells surrounding the first container section can be transferred to the battery cells surrounding the second container section via the first container section, the first connection section, the thermal conduction section, the second connection section, and the second container section. Accordingly, by the configuration of the modified heat pipe structure, the heat generated by the heat generated by the charging or discharging of the battery cells located at the back end of the airflow and at higher temperatures can be transferred to the battery cells located at the front end of the airflow and at lower temperatures. This maintains thermal balance among the battery cells and helps prevent the risk of damage or explosion due to overheating of some battery cells during charging and discharging. So, the safety of the battery module during use is increased.

To achieve the above objective, a battery module, including: a plurality of battery cells; a battery fixed holder used for accommodating and fixing the plurality of battery cells; and a modified heat pipe structure including a metal tube, the metal tube including: a thermal conduction section being a vacuum-pumped sealed tube that includes a wick structure and a working fluid thereinside, and transfers a heat through a process of evaporation and condensation of the working fluid, wherein the thermal conduction section is placed above the battery fixed holder; a first container section, placed in a gap between the plurality of adjacent battery cells, and used to store the heat generated by the plurality of adjacent battery cells in charging or discharging; and a first connection section, provided with one end connected to the first container section, and provided with other end connected to one end of the thermal conduction section by passing through the battery fixed holder vertically; wherein the battery module further includes a shell; the shell is provided at one side thereof with an air inlet, and provided on other side thereof with an air outlet, the battery fixed holder is located between the air inlet and the air outlet, the thermal conduction section is provided with the one end located at a position farther away from the air inlet, and provided with other end located at a position close to the air inlet.

In one embodiment of the disclosure, the first container section is placed in the gap between the plurality of adjacent battery cells located at positions farther away from the air inlet.

In one embodiment of the disclosure, the thermal conduction section is provided with the other end connected to a heat sink.

In one embodiment of the disclosure, the heat sink is disposed next to the air inlet.

In one embodiment of the disclosure, the metal tube further includes a second container section and a second connection section; the second connection section is placed in a gap between the plurality of adjacent battery cells located at positions closer to the air inlet, and used to store the heat generated by the plurality of adjacent battery cells; the second connection section is provided with one end connected to the second container section, and provided with other end connected to the other end of the thermal conduction section by passing through the battery fixed holder vertically.

In one embodiment of the disclosure, the air inlet is configured on a blowing air device, and the air outlet is configured on an exhausting air device.

In one embodiment of the disclosure, the first container section is filled with a phase change material thereinside, and used to store the heat generated by the plurality of adjacent battery cells in charging or discharging via the phase change material.

In one embodiment of the disclosure, the first container section is disposed with a metal foam or a metal fin thereinside.

In one embodiment of the disclosure, the first container section and the second container section are filled with a phase change material thereinside, respectively, and used to store the heat generated by the plurality of adjacent battery cells in charging or discharging via the phase change material.

In one embodiment of the disclosure, the first container section is configured with a cut, a valve, or a notch on an outer wall thereof.

DETAILED DESCRIPTION OF THE PREFERRED EMBODIMENTS

Figure 1:
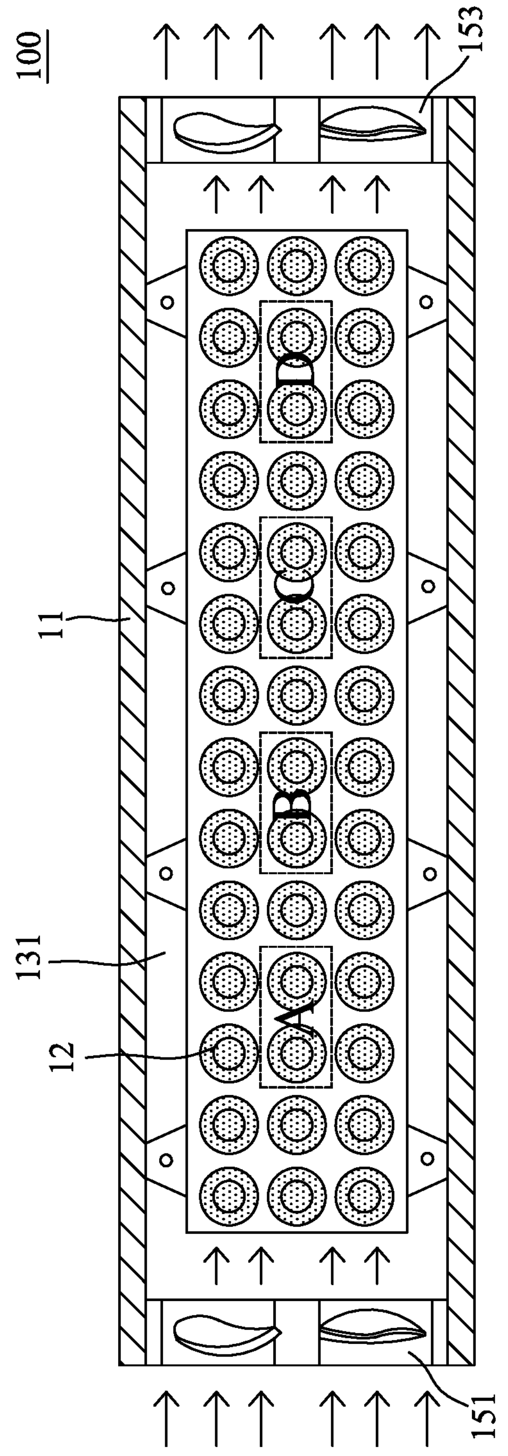
Fig. 1 (PRIOR ART)
FIG. 1 is a top sectional view of a battery module in prior art.
Figure 2:
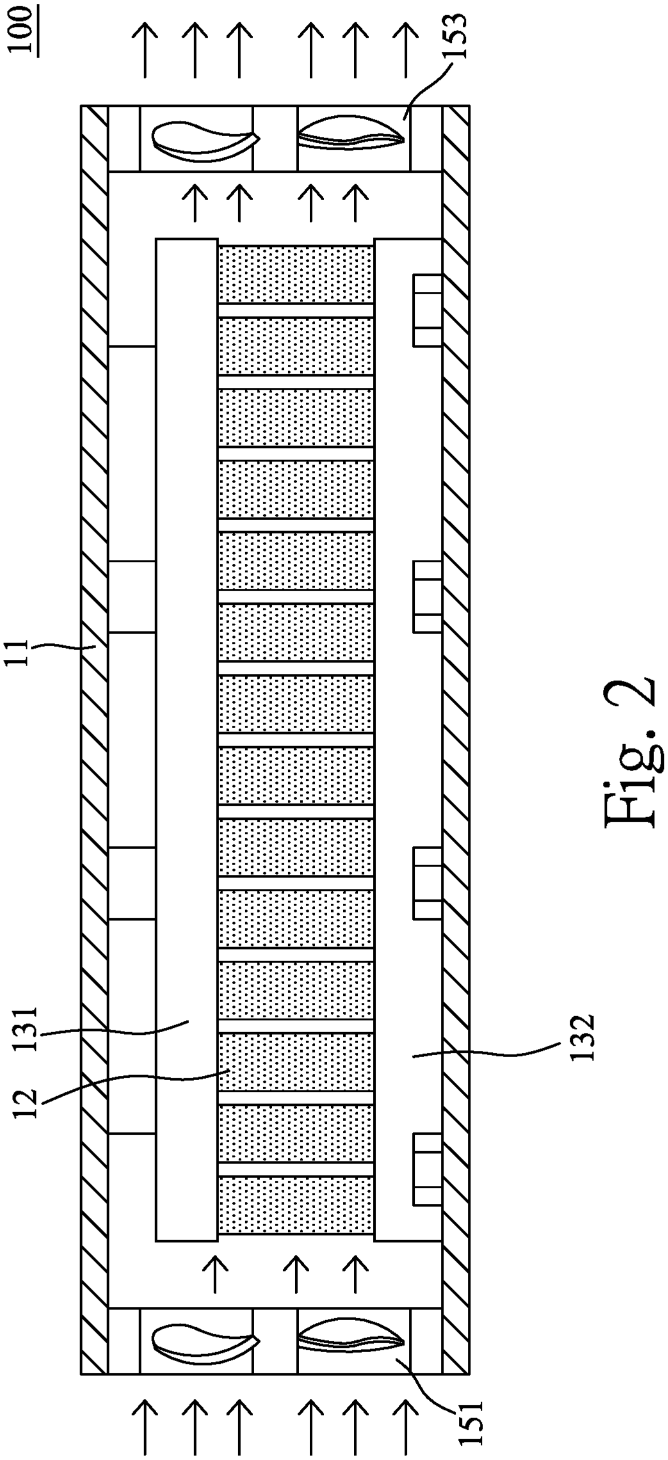
Fig. 2 (PRIOR ART)
FIG. 2 is a front sectional view of the battery module in prior art.
Figure 3:
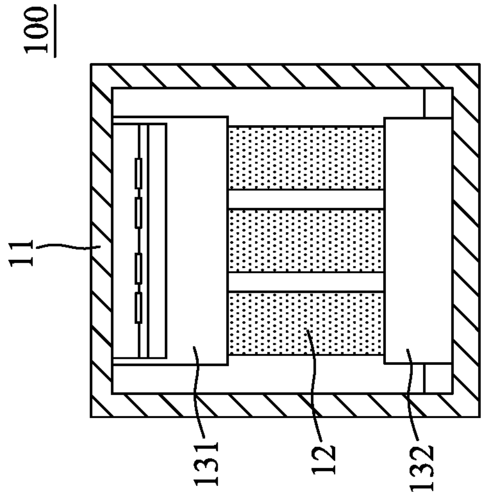
Fig. 3 (PRIOR ART)
FIG. 3 is a side sectional view of the battery module in prior art.
Figure 4:
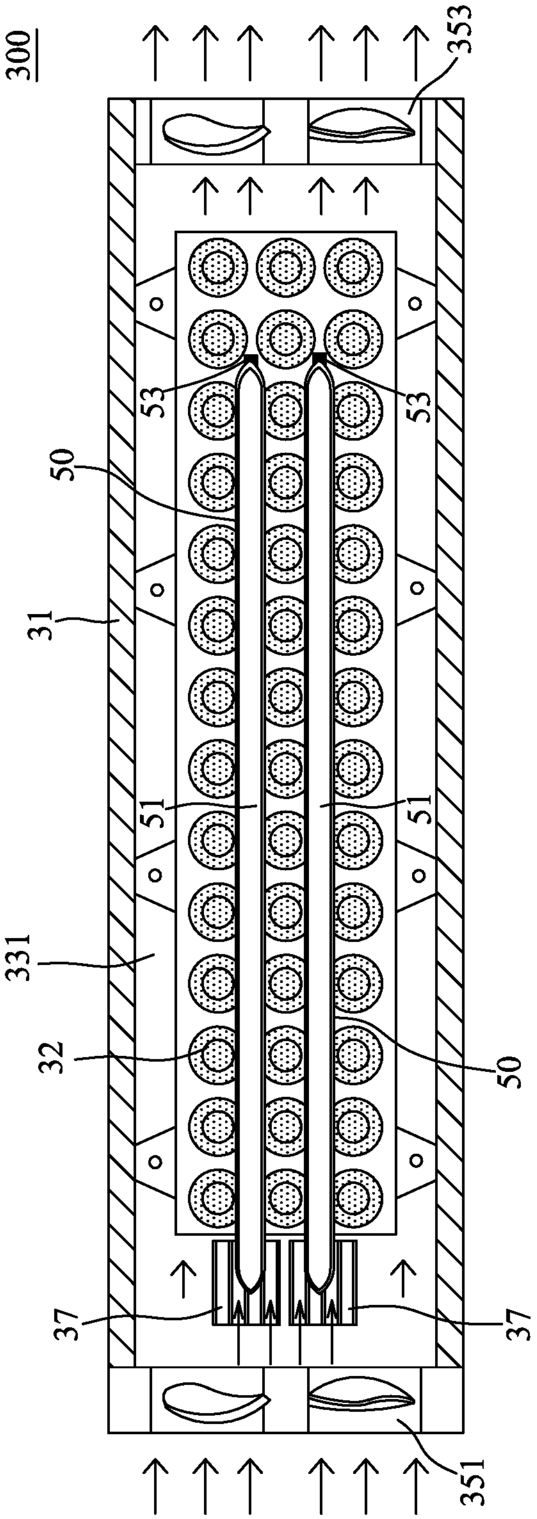
FIG. 4 is a top sectional view according to one embodiment of the disclosure.
Figure 5:
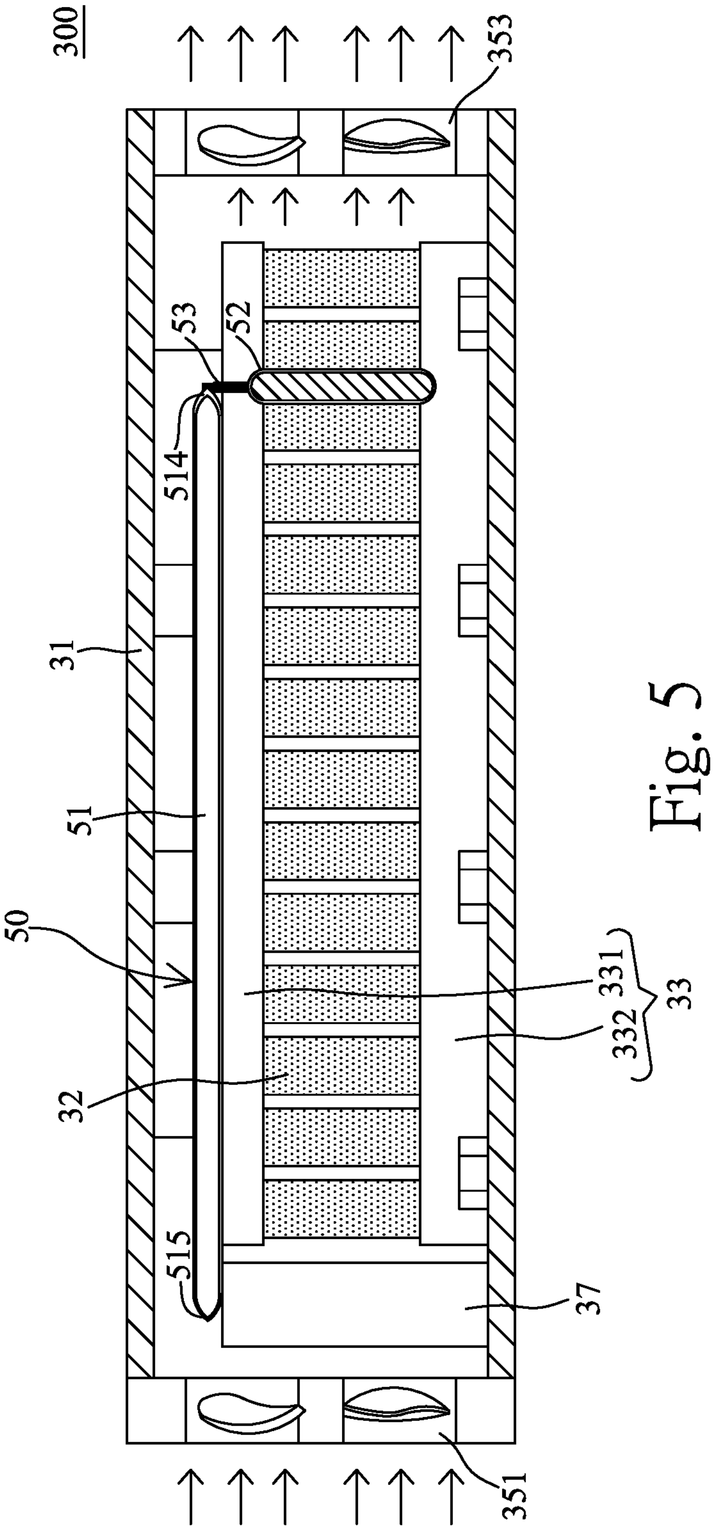
FIG. 5 is a front sectional view according to one embodiment of the disclosure.
Figure 6:
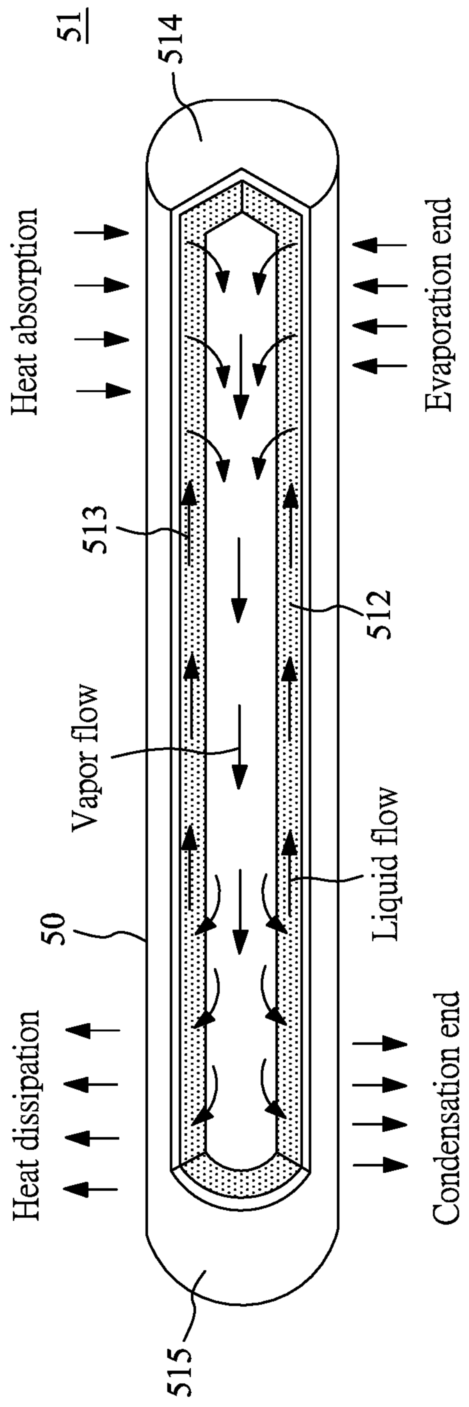
FIG. 6 is a sectional view of a thermal conduction section in a metal tube of a modified heat pipe structure of the disclosure.

Referring to FIG. 4, FIG. 5, and FIG. 6, there are shown a top sectional view and a front sectional view according to one embodiment of the disclosure, and a side sectional view of a thermal conduction section of a heat pipe of the disclosure. As shown in FIG. 4 and FIG. 5, the battery module 300 of the disclosure includes a shell 31, a plurality of battery cells 32, and a battery fixed holder 33. The shell 31 is provided on one side thereof with a blower fan device 351 having an air inlet, and provided on other side thereof with an exhaust fan device 353 having an air outlet. During the charging or the discharging of the battery module 300, a cold air enters the inside of the shell 31 via the air inlet of the blowing fan device 351, and a hot air is exhausted via the air outlet of the exhausting air device 353.

The battery fixed holder 33 includes a first fixed holder 331 and a second fixed holder 332. The first fixed holder 331 and the second fixed holder 332 includes a plurality of fixed holes, respectively. Each of the battery cells 31 is provided with one end sleeved in the corresponding fixed hole of the first fixed unit 331, and provided with other end sleeved in the corresponding fixed hole of the second fixed unit 332. So, each of the battery cells 31 can be fixed between first fixed holder 331 and the second fixed holder 332. Besides, a gap is existed between each of the battery cells 31.

Figure 7:
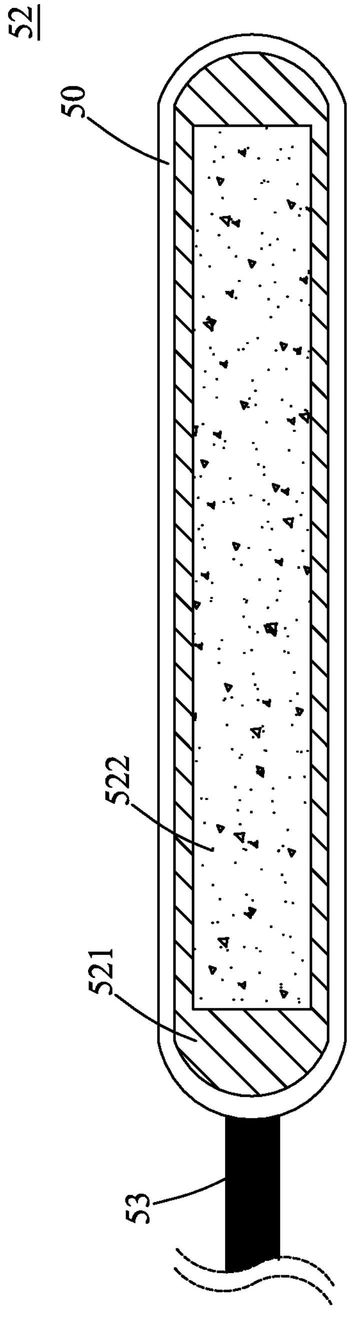
FIG. 7 is a sectional view of a first container section in the metal tube of the modified heat pipe structure according to one embodiment of the disclosure.
Figure 8:
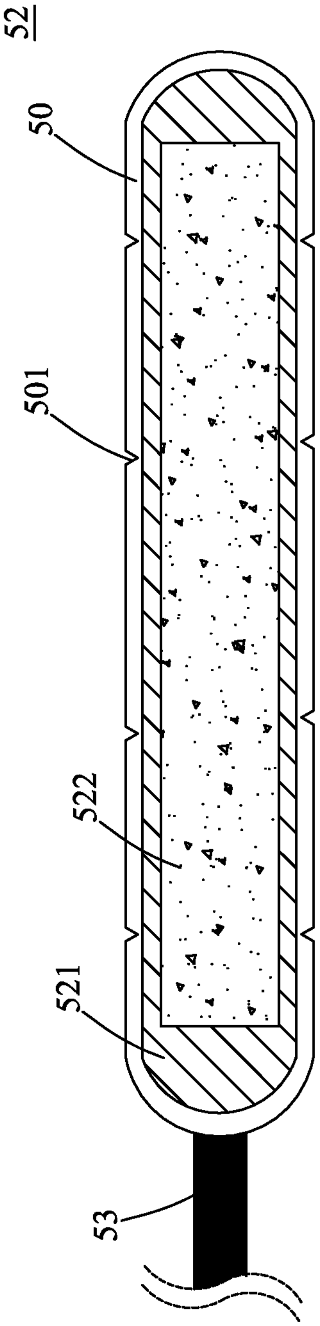
FIG. 8 is a sectional view of a first container section in the metal tube of the modified heat pipe structure according to another embodiment of the disclosure.
Figure 9:
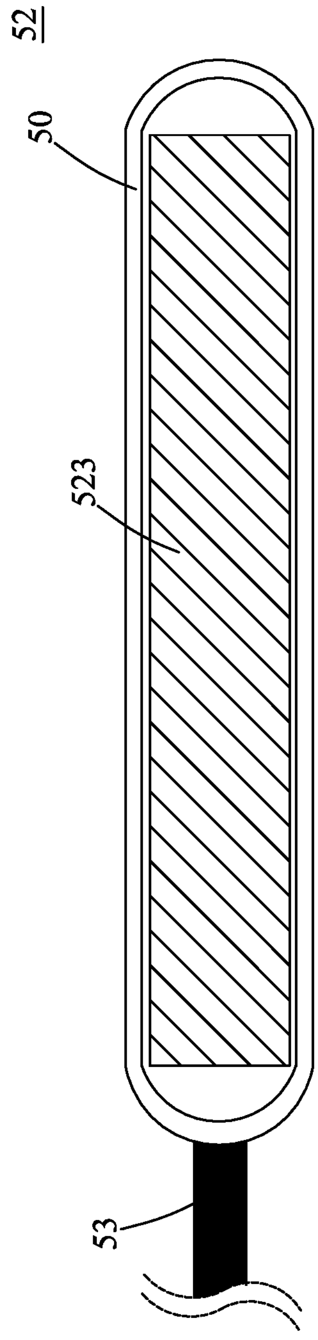
FIG. 9 is a sectional view of a first container section in the metal tube of the modified heat pipe structure according to another embodiment of the disclosure.

The battery module 300 of the disclosure has a modified heat pipe structure. The modified heat pipe structure includes a metal tube 50. The metal tube 50 is defined with a thermal conduction section 51, a first container section 52, and a first connection section 53 thereon. As shown in FIG. 6, the thermal conduction section 51 is a vacuum-pumped sealed tube, and includes a wick structure 512 and a working fluid 513 (such as water or Dowtherm™-a) thereinside. The thermal conduction section 51 is provided with one end called as an evaporation end (or heating end) 514, and provided with other end called as a condensation end (or cooling end) 515. The first container section 52 is also a vacuum-pumped sealed tube that is disposed with a heat storage body. As shown in FIG. 7, in one embodiment of the disclosure, the heat storage body is a phase change material 521, for example, water, polyethylene glycol (PEG), low density polyethylene (LDPE), polyethylene (PE), or paraffin. If the heat storage body filled in the inside of the first container section 52 is water, the first container section 52 is further disposed with a metal foam or a metal fin thereinside so as to increase the thermal conductivity on the inside of the first container section 52. As shown in FIG. 8, if the phase change material 521 is water, the first container section 52 is configured with a cut, a valve, or a notch on an outer wall thereof. When the first container section 52 damages because of a thermal runaway of the adjacent battery cells 32, the water can be sprayed or flowed to the thermal runaway battery cells 32 from the cut, the valve, or the notch on the outer wall of the first container section 52 to reduce the chain reaction of thermal runaway in the battery module 100. As shown in FIG. 9, in one embodiment of the disclosure, the heat storage body is a metal column 523 used as a heat collector. Furthermore, the first connection section 43 presents a flat shape, which is made by a pressing process on part of the metal tube 50.

The thermal conduction section 51 is disposed above the battery fixed holder 33. The first container section 52 is placed a gap between multiple adjacent battery cells 32. The battery cells 32 located at positions farther away from the air inlet are often operating a higher high temperature during charging and discharging. Thus, preferably, the first container section 52 will be placed in the gap between the multiple adjacent battery cells 32 located at positions farther away from the air inlet. Besides, the thermal conduction section 51 is connected to the first container section 52 via the first connection section 53. The first connection section 53 is provided with one end connected to the first container section 52, and provided with other end connected to the evaporation end 514 of the thermal conduction section 51 by passing through the first fixed holder 331 of the battery fixed holder 33 vertically.

As shown in FIG. 4, FIG. 5, and FIG. 6, specifically, when the battery module 300 is operating, the first container section 52 absorbs the heat generated by the surrounding battery cells 32 in the charging and discharging, and stores the heat that can't be dissipated in time in the phase change material 521 or the metal column 523 inside the first container section 52. The heat absorbed by the first container section 52 can be conducted to the evaporation end 514 of the thermal conduction section 51 via the first connection section 53. The working fluid 513 within the thermal conduction section 51 after absorbing the heat will undergoes a phase change to change from a liquid to a vapor, and then the working fluid 513 can quickly transfer the heat to the condensation end 515 in vapor flow. After the heat has transferred to the condensation end 515, the heat will be dissipated on the condensation end 515, and the working fluid 513 will be condensed on the condensation end 515. The working fluid 513 condensed will be transferred back to the evaporation end 514 in liquid flow via a capillary action of the wick structure 512. Therefore, through the phase change of evaporation and condensation repeatedly occurring on the working fluid 513 inside the heat pipe 51, the heat generated by the charging and discharging of the battery cells 32 located at positions farther away from the air inlet can be effectively taken away by the modified heat pipe structure to achieve the purpose of cooling down.

The battery module 300 further comprises a heat sink 37. The condensation end 515 of the thermal conduction section 51 is connected to the heat sink 37 so that the heat transferred by the thermal conduction section 51 can be dissipated by the heat sink 37. Ideally, the heat sink 37 is placed next to the blowing air device 351. The heat dissipation of the heat sink 37 can be efficiency enhanced by the blowing air of the blowing air device 351.

Figure 10:
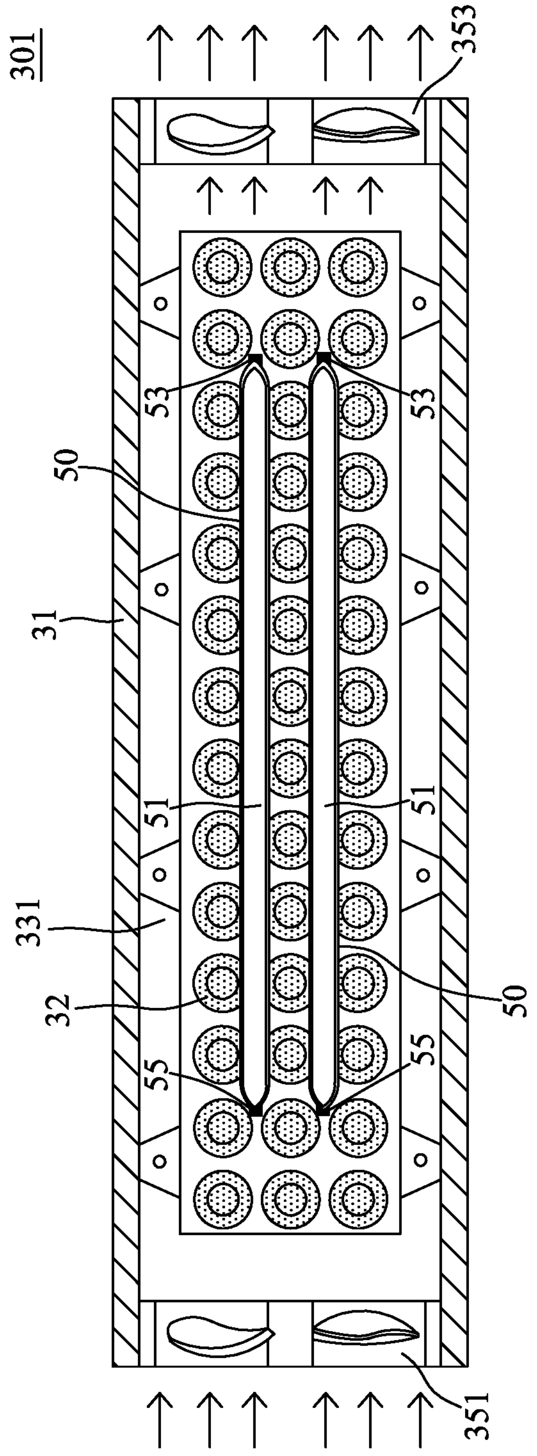
FIG. 10 is a top sectional view according to another embodiment of the disclosure.
Figure 11:
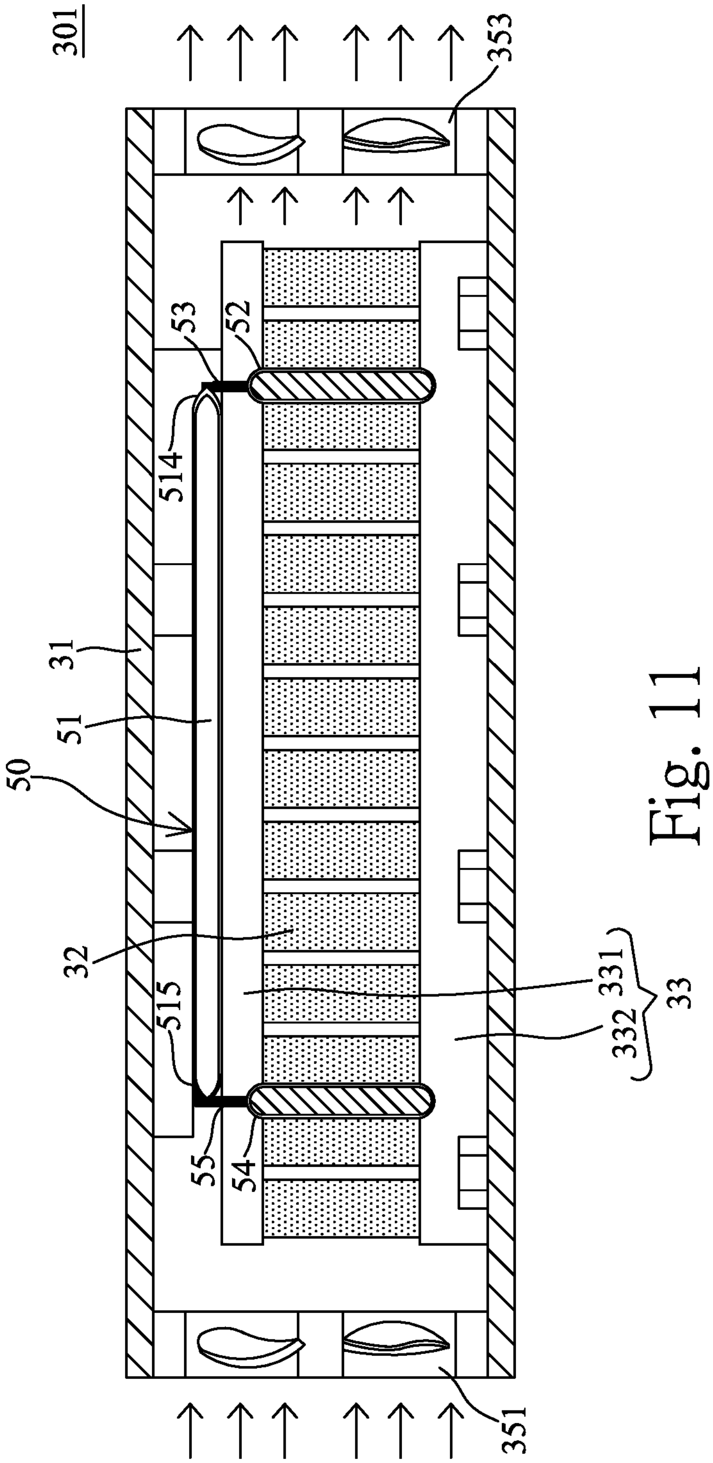
FIG. 11 is a front sectional view according to another embodiment of the disclosure.

Referring to FIG. 10 and FIG. 11, there are shown a top sectional view and a front sectional view according to other embodiment of the disclosure. As shown in FIG. 10 and FIG. 11, in the battery module 301 of the present embodiment, the metal tube 50 is further defined with a second container section 54 and a second connection section 55 thereon. The second container section 54 is also a vacuum-pumped sealed tube, which can be filled with the phase change material 521 and the metal foam 522 thereinside, or disposed with the metal column 523 thereinside. The second connection section 55 presents a flat shape, which is made by a pressing process on part of the metal tube 50.

In the present embodiment, the second container section 54 can be placed in the gap between the multiple adjacent battery cells 32 located at positions where are closer to the air inlet. The thermal conduction section 51 is connected to the second container section 54 via the second connection section 55. The second connection section 55 is provided with one end connected to the second container section 54, and provided with other end connected to the condensation end 515 of the thermal conduction section 51 by passing through the first fixed holder 331 of the battery fixed holder 33 vertically.

As shown in FIG. 6, FIG. 10, and FIG. 11, when the battery module 301 is operating, the first container section 52 absorbs the heat generated by the surrounding battery cells 32 in the charging and discharging, and stores the heat that can't be dissipated in time in the phase change material 521 or the metal column 523 inside the first container section 52. The heat absorbed by the first container section 52 can be conducted to the evaporation end 514 of the thermal conduction section 51 via the first connection section 53. The working fluid 513 within the thermal conduction section 51 after absorbing the heat will undergoes a phase change to change from a liquid to a vapor, and then the working fluid 513 can quickly transfer the heat to the condensation end 515 in vapor flow. After the heat has transferred to the condensation end 515, the heat will be conducted to the second container section 54 via the second connection section 55, so as to absorb and store the heat by the use of the phase change material 541 or the metal column 523. The working fluid 513 on the condensation end 515, after having its heat absorbed by the second container section 54, will be condensed and transformed from vapor to liquid. The condensed working fluid 513 will then be transferred back to the evaporation end 514 in liquid flow through the capillary action of the wick structure 512. Therefore, through the configuration of the modified heat pipe structure, the heat generated by the battery cells 32 located farther away from the air inlet can be transferred to the battery cells 32 located closer to the air inlet, so that temperatures between the battery cells 32 in the battery module 100 can maintain a thermal balance.

Accordingly, through the first container section 52, the first connection section 53, the thermal conduction section 51, the second connection section 55, and the second container section 54, the heat generated by the battery cells 32 located farther away from the air inlet can be transferred to the battery cells 32 located closer to the air inlet. This maintains thermal balance among the battery cells 32 and helps prevent the risk of damage or explosion due to overheating of some battery cells 32 during charging and discharging. So, the safety of the battery module 301 during use is increased.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

The invention claimed is:

1. A battery module, including:

a plurality of battery cells;

a battery fixed holder used for accommodating and fixing the plurality of battery cells; and a modified heat pipe structure including a metal tube, the metal tube including:

a thermal conduction section being a vacuum-pumped sealed tube that includes a wick structure and a working fluid thereinside, and transfers heat through a process of evaporation and condensation of the working fluid, wherein the thermal conduction section is placed above the battery fixed holder;

a first container section, placed in a gap between the plurality of adjacent battery cells, and used to store the heat generated by the plurality of adjacent battery cells in charging or discharging; and a first connection section, provided with one end connected to the first container section, and provided with other end connected to one end of the thermal conduction section by passing through the battery fixed holder vertically, wherein the first connection section conducts the heat absorbed by the first container section to the thermal conduction section.

2. The battery module according to claim 1, wherein the battery module further includes a shell; the shell is provided at one side thereof with an air inlet, and provided on other side thereof with an air outlet, the battery fixed holder is located between the air inlet and the air outlet, the thermal conduction section is provided with the one end located at a position farther away from the air inlet, and provided with other end located at a position close to the air inlet.

3. The battery module according to claim 2, wherein the first container section is placed in the gap between the plurality of adjacent battery cells located at positions farther away from the air inlet.

4. The battery module according to claim 3, wherein the metal tube further includes a second container section and a second connection section; the second connection section is placed in a gap between the plurality of adjacent battery cells located at positions closer to the air inlet, and used to store the heat generated by the plurality of adjacent battery cells; the second connection section is provided with one end connected to the second container section, and provided with other end connected to the other end of the thermal conduction section by passing through the battery fixed holder vertically.

5. The battery module according to claim 4, wherein the first container section and the second container section are filled with a phase change material thereinside, respectively, and used to store the heat generated by the plurality of adjacent battery cells in charging or discharging via the phase change material.

6. The battery module according to claim 5, wherein the first container section and the second container section are disposed with a metal foam or a metal fin thereinside.

7. The battery module according to claim 4, wherein the first container section and the second container section are disposed with a metal rod thereinside, respectively, and used to store the heat generated by the plurality of adjacent battery cells in charging or discharging via the metal rod.

8. The battery module according to claim 2, wherein the thermal conduction section is provided with the other end connected to a heat sink.

9. The battery module according to claim 8, wherein the heat sink is disposed next to the air inlet.

10. The battery module according to claim 2, wherein the air inlet is configured on a blowing air device, and the air outlet is configured on an exhausting air device.

11. The battery module according to claim 1, wherein the first container section is filled with a phase change material thereinside, and used to store the heat generated by the plurality of adjacent battery cells in charging or discharging via the phase change material.

12. The battery module according to claim 11, wherein the first container section is disposed with a metal foam or a metal fin thereinside.

13. The battery module according to claim 11, wherein the first container section is configured with a cut, a valve, or a notch on an outer wall thereof.

14. The battery module according to claim 1, wherein the first container section is disposed with a metal rod thereinside, and used to store the heat generated by the plurality of adjacent battery cells in charging or discharging via the metal rod.

* * * * *